United States Patent [19]

El-Shoubary et al.

[11] Patent Number: 5,770,537
[45] Date of Patent: Jun. 23, 1998

[54] LOW-TEMPERATURE METHOD TO REGENERATE CARBON LOADED WITH SULFUR COMPOUNDS

[75] Inventors: Youssef El-Shoubary, Clifton Park; Bang Mo Kim, Schenectady; Donald Franklin Foust, Scotia; Norman Zethward Shilling, Schenectady, all of N.Y.

[73] Assignee: General Electric Company, Schenectady, N.Y.

[21] Appl. No.: 566,517

[22] Filed: Dec. 4, 1995

[51] Int. Cl.[6] .............................. B01J 20/36; B01J 38/48; B01J 38/64
[52] U.S. Cl. .............................................. 502/25; 502/22
[58] Field of Search ................................. 502/20, 22, 24, 502/25

[56] References Cited

U.S. PATENT DOCUMENTS

| | | | |
|---|---|---|---|
| 1,327,222 | 1/1920 | Blardone | 502/25 |
| 2,455,260 | 11/1948 | Murdink | 502/25 |
| 4,407,725 | 10/1983 | Allen et al. | 502/25 |
| 4,434,240 | 2/1984 | Pugach | 502/24 |
| 5,464,604 | 11/1995 | Suehiro et al. | 423/570 |

OTHER PUBLICATIONS

"Survey of Advanced Systems" based on Status of Flue Gas Desulfurization in the U.S., prepapred by B.A. Laseke and T.W. Devitt of PEDCo Environmental, Inc. in Symposium--vol. 1, pp. 58–84, 1981.

"Carbon Adsorption Process" based on the NATO–CCMS study, Flue Gas Desulfurization Pilot Study–Phase 1–Survey of Major Installations–Carbon–Adsorption Flue Gas Desulfurization Process, Appendix 95–K, Jan. 1979, NTIS PB–295 012, prepared by N. Haug of Umweltbundesamt and G. Oelert and G. Weiser of Battelle Institut e.V., pp. 274–281.

Primary Examiner—Glenn Caldarola
Assistant Examiner—Alexander G. Ghyka
Attorney, Agent, or Firm—Noreen C. Johnson; Douglas E. Stoner

[57] ABSTRACT

Disclosed is a low-temperature process for regenerating carbon adsorbents utilized in flue gas desulfurization where carbon loss is minimized. The carbon adsorbent is soaked or washed in a basic reducing solution having a pH greater than 7.0 at room temperature to remove sulfur-containing compounds from carbon.

10 Claims, 7 Drawing Sheets

LOW-TEMPERATURE METHOD TO REGENERATE CARBON LOADED WITH SULFUR COMPOUNDS

FIELD OF THE INVENTION

This invention relates to a method for carbon regeneration at room temperature using reducing agents. In particular, this invention relates to a method of regenerating carbon adsorbents contaminated with sulfur utilized in flue gas desulfurization.

BACKGROUND OF THE INVENTION

Flue gas desulfurization processes are important due to the strict control by environmental regulations of sulfur-containing compounds being discharged into the environment. Flue gas desulfurization processes, also referred to as FGD, can conveniently be categorized by the manner in which the sulfur compounds removed from the flue gases are eventually produced for disposal. Three main categories exist.

The first category is termed "throwaway process" in which the eventual sulfur product is disposed of as waste. Disposal can include a landfill or pond. The processes in this category involve wet scrubbing of the flue gases for absorption, followed by various methods for neutralizing the acidity, separating the sulfur compounds from the scrubbing liquor, and usually recycling at least part of the scrubbing liquor.

A second category is the gypsum processes, which are designed to produce gypsum of sufficient quality either for use as an alternative to natural gypsum or as a well-defined waste product. As with the throwaway processes, this category involves wet scrubbing for absorption followed by various methods of neutralizing the lime or limestone and recovering the sulfur compound. An oxidation step is included to insure recovery of the sulfur compounds in the form of gypsum.

Regenerative processes, the third category, are designed to specifically regenerate the primary reactants and concentrate the sulfur dioxide ($SO_2$) that has been removed from the flue gases. Further processing can convert the concentrated sulfur dioxide ($SO_2$) into sulfuric acid or elemental sulfur, or physical processing into liquefied sulfur dioxide. Processes in this category contain both wet scrubbing and dry adsorption processes. Wet scrubbing techniques include scaling, pH control, reheating and waste disposal. To overcome problems associated with these techniques, the use of activated carbon adsorbents to remove sulfur oxides from flue gases has been used. With oxygen and water in the flue gas, a sulfur loading of the activated carbon ranges between about five and fifteen percent is feasible.

Sorption of sulfur dioxide ($SO_2$) by activated carbon can be both chemical and physical. The degree of each sorption mode is determined by the presence of oxygen ($O_2$) and water ($H_2O$) vapor in the gas. The active carbon adsorbent surface catalyzes oxidation of $SO_2$ to $SO_3$, which forms $H_2SO_4$ (sulfuric acid) in the adsorbent pores with the water vapor, thus increasing the degree of chemisorption at the expense of physicosorption. The sulfuric acid remains in the carbon pores until regeneration of the carbon.

Generally, regeneration processes for carbon adsorpents occur at elevated temperatures above 120° C., and particularly, above about 400° C. As the temperature increases during the regeneration process, the acid reacts with the carbon and forms carbon dioxide. In addition, the carbon will reduce $SO_3$ to $SO_2$. This reaction produces carbon monoxide and carbon dioxide. These reactions cause carbon loss that consequently affect the process economics and effectiveness of the carbon adsorbent.

The carbon loss reactions during regeneration of the carbon adsorbent are:
1. $SO_2+H_2O+0.5\ O_2 \rightarrow H_2SO_4$
2. $2H_2SO_4+C \rightarrow CO_2+2H_2O+2SO_2$
3. $SO_3+0.5C \rightarrow SO_2+0.5CO_2$
4. $SO_3+C \rightarrow SO_2+CO$.

These reactions occur at elevated temperatures above 120° C. To prevent carbon loss, the regeneration of the carbon adsorbent should occur at low temperatures, meaning temperatures below 120° C. Thus, there is a need for a regeneration process of carbon adsorbents at low temperatures below 120° C. to avoid carbon loss. Such a low temperature process would increase the effectiveness of the carbon adsorbent while providing a longer life of the carbon for use in flue gas desulfurization.

SUMMARY OF THE INVENTION

This invention satisfies the need by providing a method for regenerating a carbon adsorbent contaminated with sulfur or sulfur-containing compounds comprising the steps of: forming a basic reducing solution by admixing a sufficient amount of a reducing agent with water to form an admixture and if needed, adjusting the pH of the admixture to above 7.0 with a sufficient amount of base to obtain the basic reducing solution; and then soaking the contaminated carbon adsorbent in the basic reducing solution at a temperature below 120° C. for a sufficient amount of time to reduce $SO_3$ to a $SO_2$ by-product and to neutralize sulfuric acid to a sulfate salt by-product thereby reducing carbon loss during regeneration of the carbon adsorbent. A sufficient amount of a reducing agent is an amount necessary to reduce $SO_3$ to $SO_2$ in the carbon adsorbent. A sufficient amount of a base is an amount to keep the pH of the reducing solution above 7.0.

Reducing agents may include alkaline or alkaline earth salts of sulfites and borohydrides, such as sodium sulfite, potassium sulfite, or sodium borohydride, and mixtures thereof. Other reducing agents, such as organic reducing agents, may be used, including ascorbic acid and oxalic acid. If the reducing agent does not produce a basic solution when admixed with water, the admixture of reducing agent and water is adjusted with a base to raise the pH of the admixture to above 7.0. Examples of bases are sodium hydroxide, potassium hydroxide, and ammonium hydroxide.

The invention can be further described as a wet method for regenerating carbon adsorbents used in flue gas desulfurization that are contaminated with sulfur-containing species, said method comprises washing the carbon adsorbent with a basic reducing solution having a pH between about 7.0 to 12.0 at a temperature below 120° C. for a sufficient amount of time to remove sulfur-containing species from the carbon adsorbent.

An advantage of this invention is the use of low temperatures below 120° C. at which the regeneration reactions take place. The low temperature capability provides energy cost savings as well as increased safety precautions by reducing the risk of fire that is posed by high temperature carbon regeneration processes. A further advantage of this invention is that the carbon adsorbent has a longer life due to little or no loss of carbon from the regeneration reactions. The carbon does not enter into the reactions of the sulfur or sulfur-containing species removal from the adsorbent. Additionally, the sulfur species can be recovered as sulfur dioxide and further processed as elemental sulfur or acid. The sulfur species may also be recovered as a sulfate salt that can be sold as a by-product.

DESCRIPTION OF THE INVENTION

Generally, in thermal carbon regeneration processes used in flue gas desulfurization, carbon reacts with sulfur compounds adsorbed on the carbon. The carbon reacts with both sulfuric acid and with $SO_3$. These reactions cause carbon loss and consequently make the carbon adsorption expensive to use. The carbon loss reactions occur at temperatures above 120° C. Accordingly, it is an object of this invention to regenerate the carbon used in flue gas desulfurization at a temperature below 120° C. Temperatures below 120° C. are herein referred to as low-temperature methods of carbon regeneration. Preferably, the temperature is room temperature. However, higher temperatures up to 120° C. may be utilized to speed the rate of the reaction without causing carbon loss.

The carbon regeneration method of this invention involves washing or soaking the carbon adsorbent that is used in the flue gas desulfurization in a reducing solution. The reducing solution is basic and has a pH above 7.0. The pH range is from above 7.0 to about 12.0 and the preferred range is about 8.0 to 10.0. The reducing solution is made by admixing a suitable reducing agent, such as sodium sulfite or sodium borohydride, with an aqueous medium, such as water, to obtain a solution which needs to have a pH greater than 7.0. A base, such as sodium hydroxide, may be used to adjust the reducing solution to above 7.0. Any reducing agent that is compatible with carbon and sulfur may be used provided a basic solution is obtained when the reducing agent is admixed with water and the pH is adjusted and maintained above 7.0.

The reducing agent reduces $SO_3$ to $SO_2$ to prevent carbon loss. The basic solution neutralizes the sulfuric acid in the carbon pores thereby preventing any further carbon loss. Reducing agents such as sodium sulfite and sodium borohydride give reducing solutions with pH above 7. Sodium sulfite is a preferred reducing agent because of its low cost and availability. In addition, sodium sulfite can be used for longer times in a cyclic reaction since it is a byproduct under the chosen reaction conditions and can be reused. For instance, sodium hydroxide will react with sodium dioxide to form sodium sulfite and water. Using sodium sulfite as the reducing agent, the following reactions demonstrate the invention at room temperature.

1. $Na_2SO_3 + 2H_2O \rightarrow 2NaOH + H_2SO_3$
2. $2NaOH + SO_2 \rightarrow Na_2SO_3 + H_2O$
3. $H_2SO_4 + 2NaOH \rightarrow Na_2SO_4 + 2H_2O$
4. $SO_3 + Na_2SO_3 \rightarrow Na_2SO_4 + SO_2$
5. $SO_3 + H_2SO_3 \rightarrow H_2SO_4 + SO_2$.

The sulfur dioxide generated in steps (4) and (5) is reused in step (2). The sulfuric acid generated in step (5) is combined with sodium hydroxide in step (3) to form sodium sulfate. These reactions show that the carbon regeneration occurs with no carbon loss.

Figure 1:
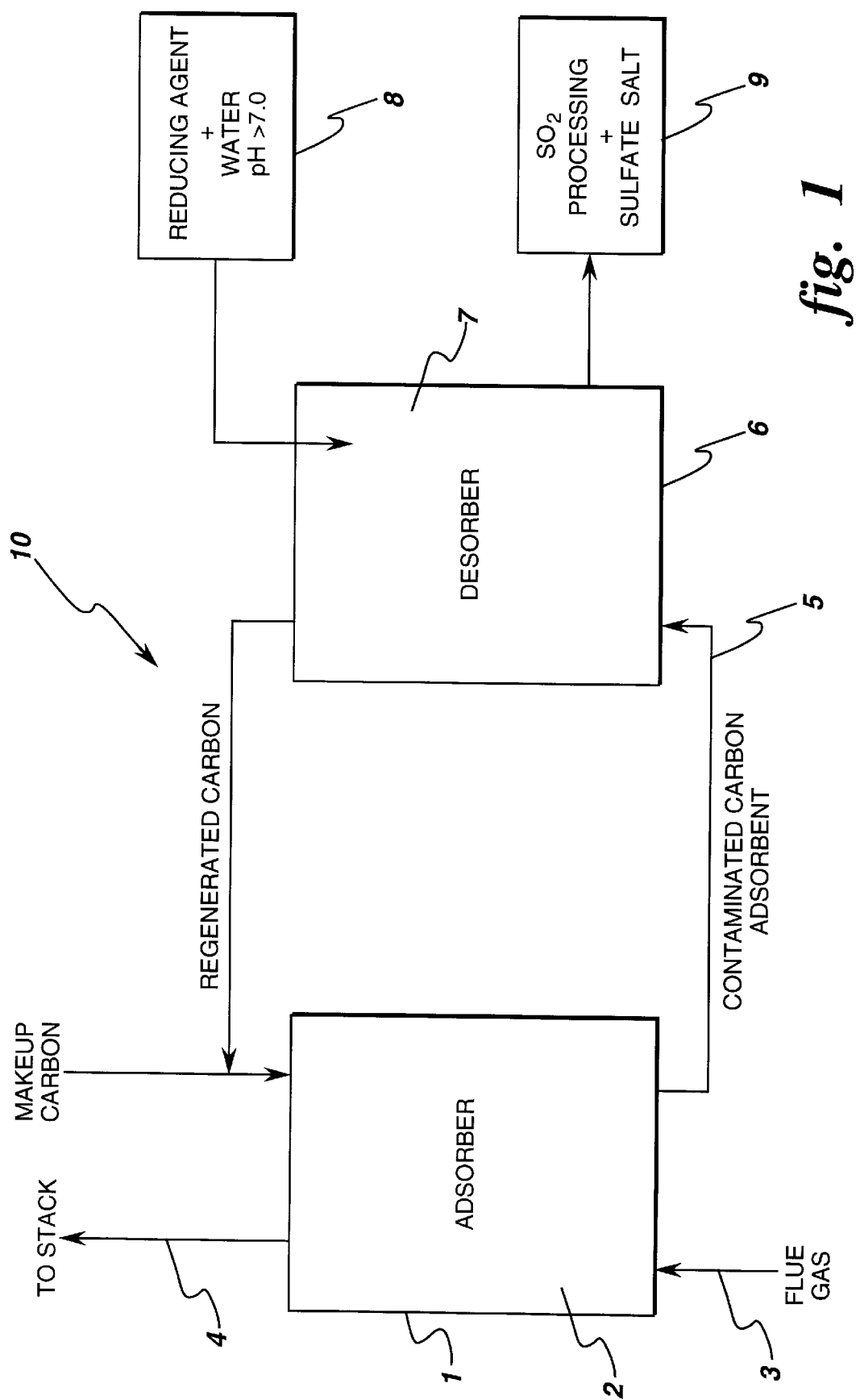
FIG. 1 is a flow diagram depicting the regeneration process of the carbon adsorbent.
Figure 2:
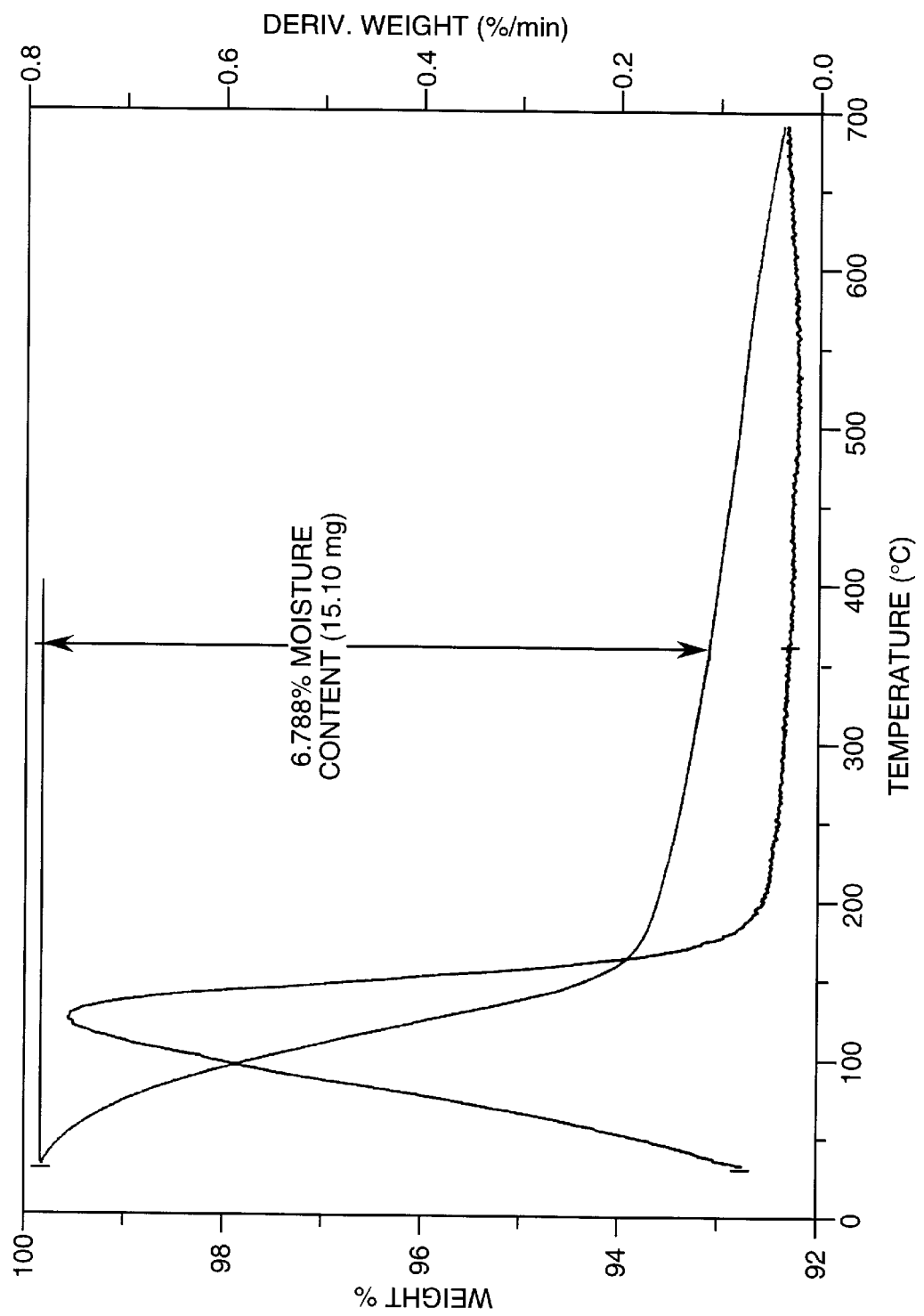
FIG. 2 is a thermogram of clean carbon that is used as a baseline.
Figure 3:
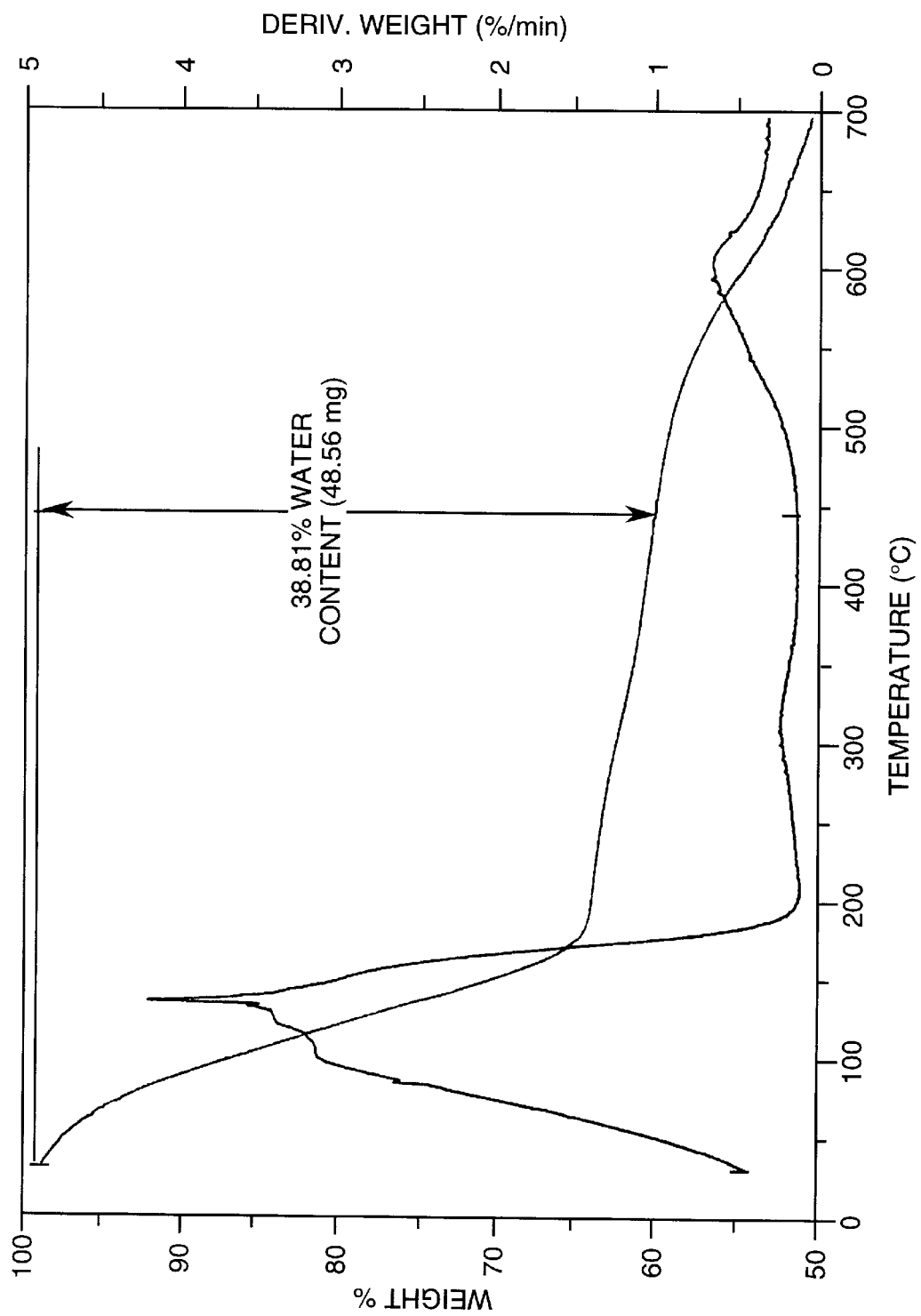
FIG. 3 is a thermogram of contaminated carbon after soaking in a sodium sulfite reducing solution for fifteen minutes.
Figure 4:
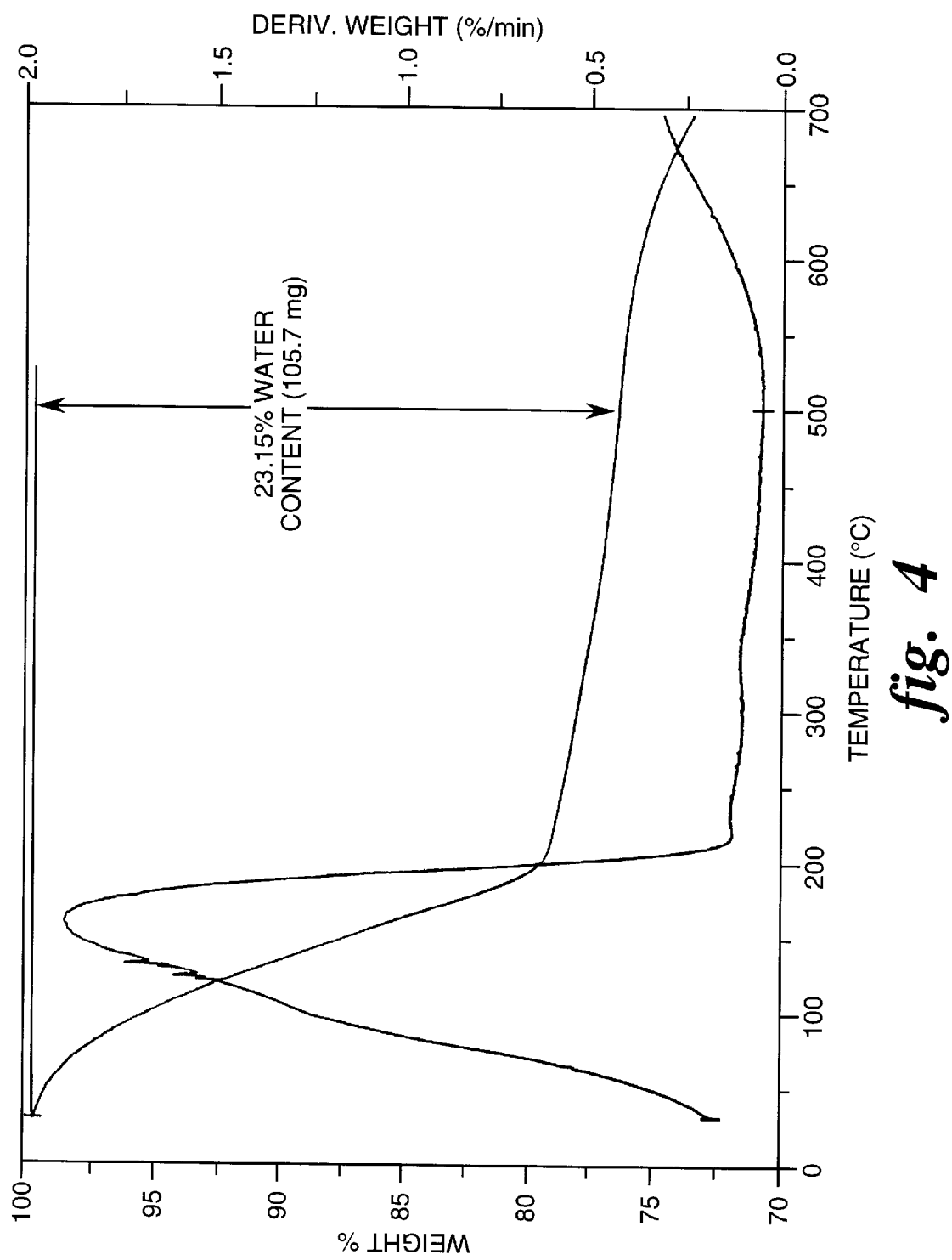
FIG. 4 is a thermogram of contaminated carbon after soaking in a sodium sulfite reducing solution for twenty minutes.
Figure 5:
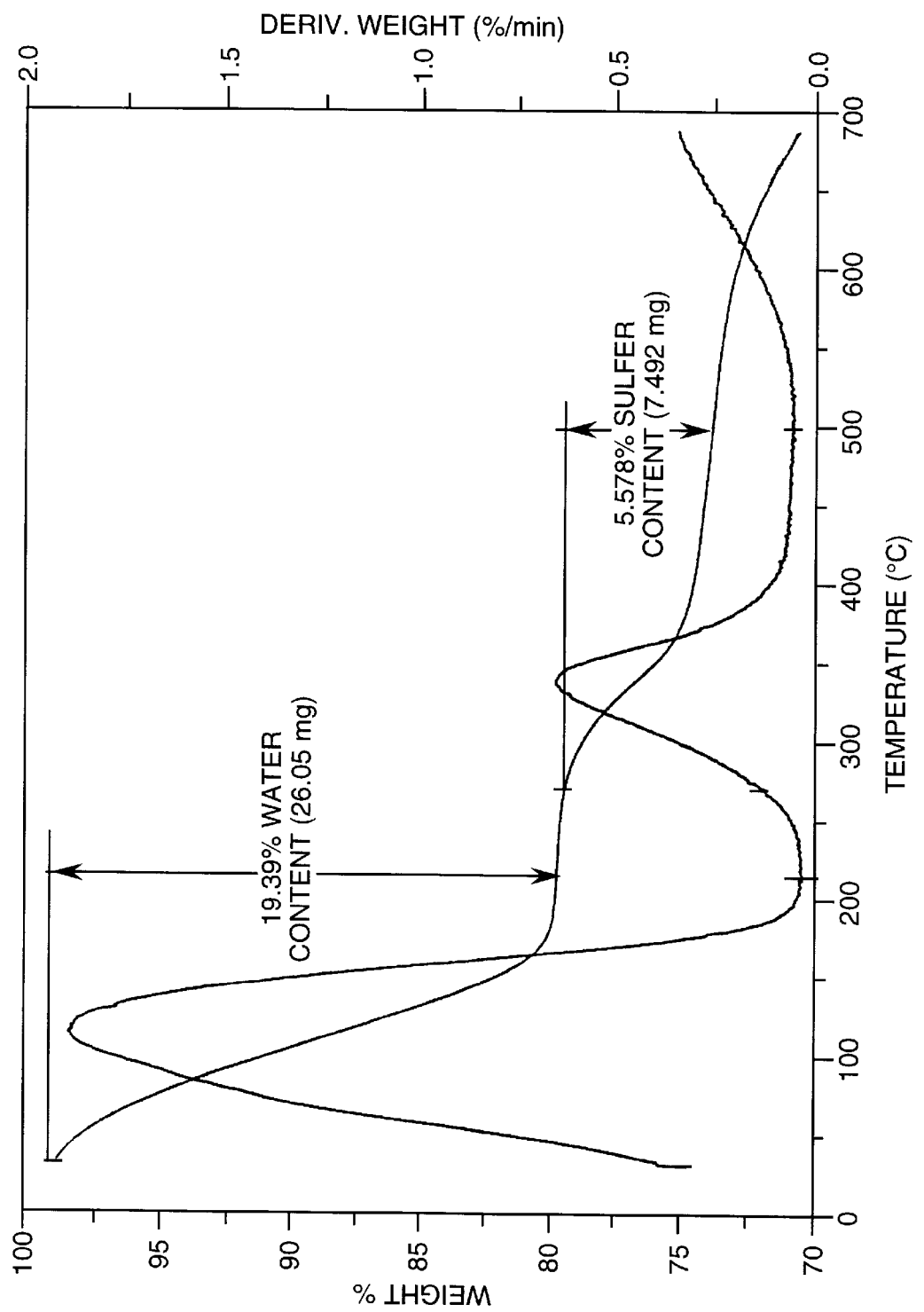
FIG. 5 is a thermogram of contaminated carbon after soaking in water for twelve hours.
Figure 6:
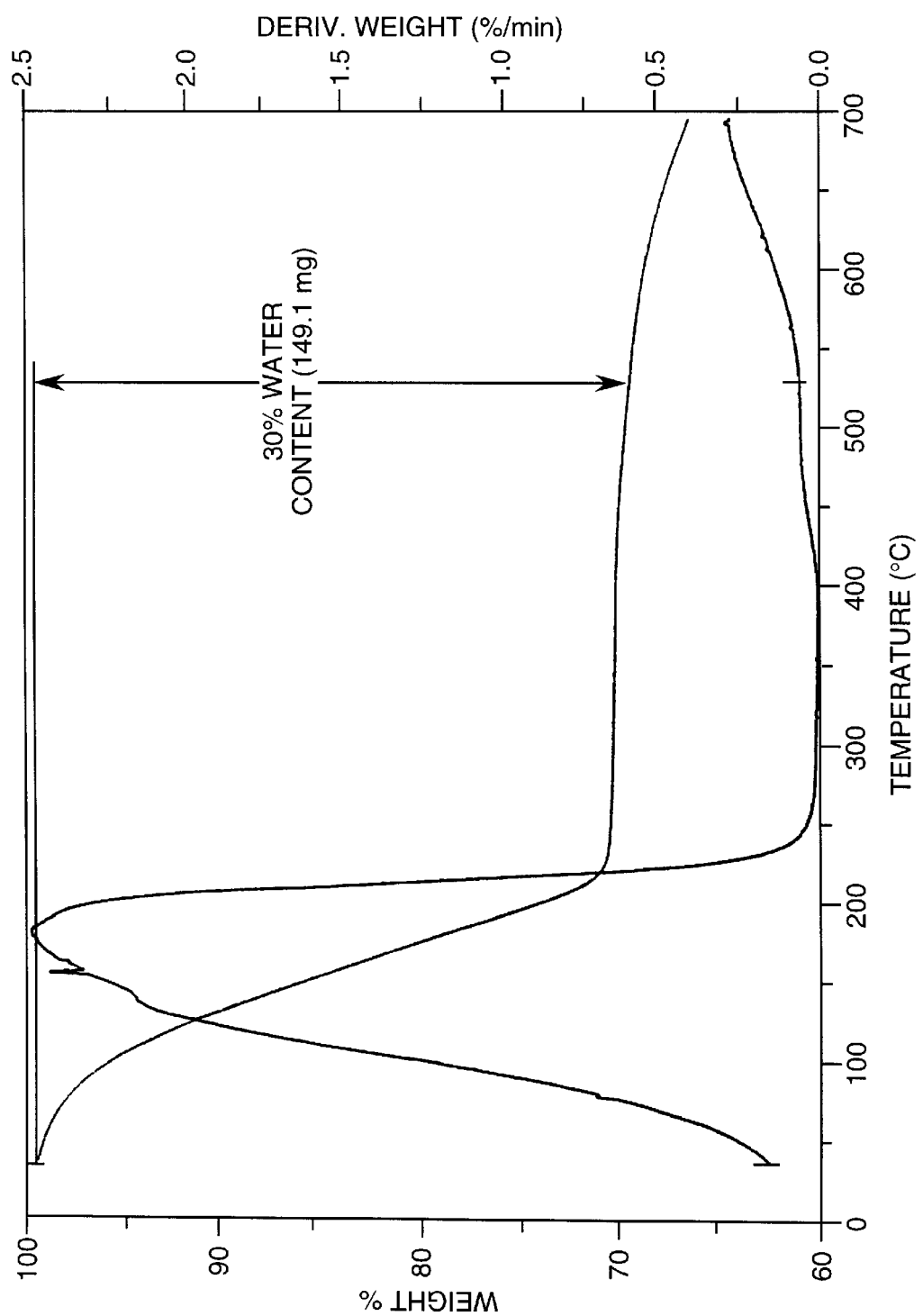
FIG. 6 is a thermogram of contaminated carbon after soaking in a sodium carbonate reducing solution for three days.
Figure 7:
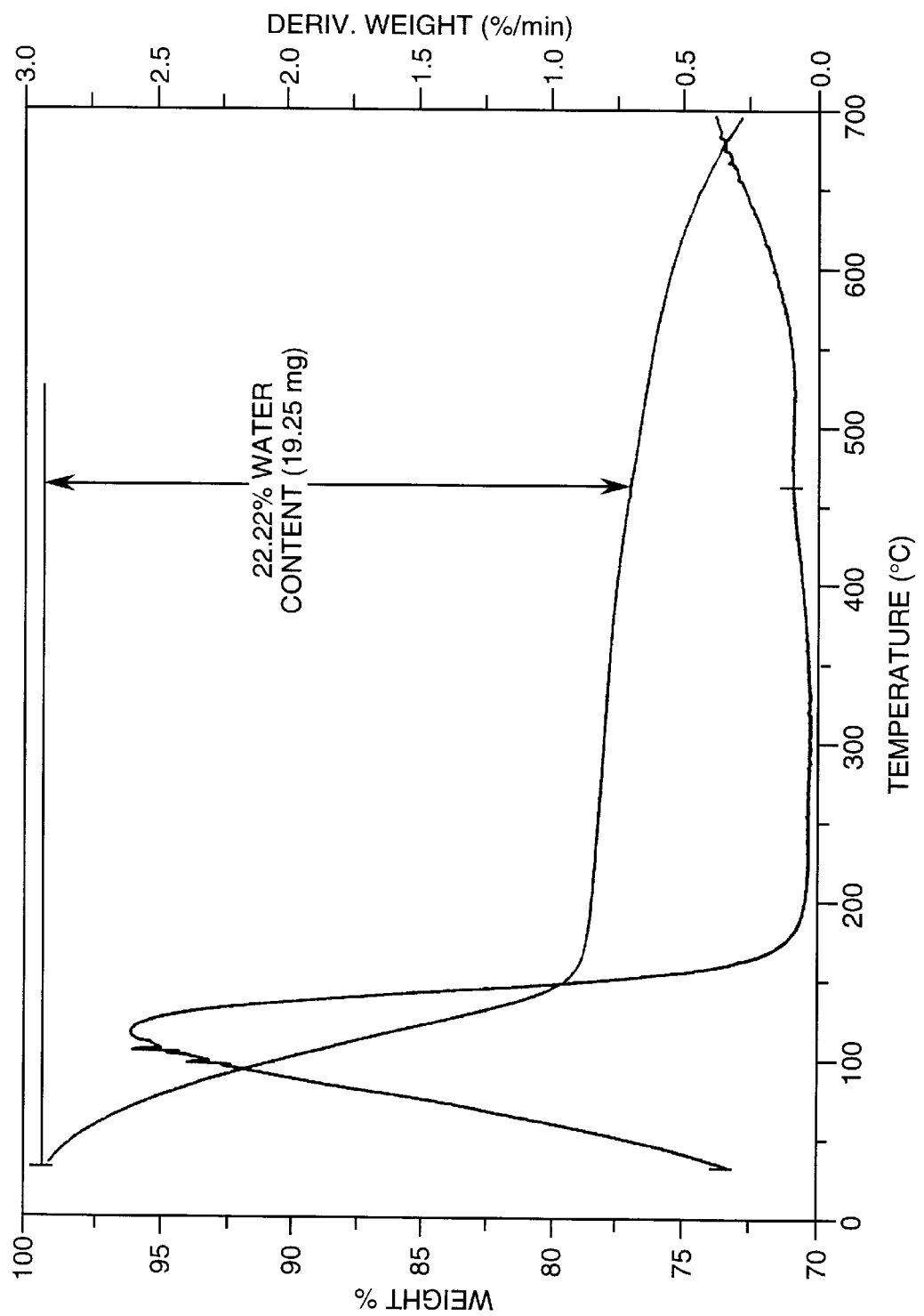
FIG. 7 is a thermogram of contaminated carbon after soaking in a sodium borohydride reducing solution for up to sixty minutes.

To further demonstrate the invention for regenerating carbon adsorbents used in flue gas desulfurization technology, now turning to FIG. 1, there is shown one embodiment of the invention. Coming from the boiler the flue gas 3 enters the adsorber tank 1 where the gas is brought into contact with the activated carbon adsorbent 2. The desulfurized flue gas 4 passes to the stack directly, while the carbon adsorbent loaded with sulfur and sulfur-containing species 5 is transferred to the desorber vessel 6. The contaminated carbon adsorbent 7 in the desorber vessel 6 is washed or soaked with a reducing solution 8 comprising a reducing agent, such as sodium sulfite, and water. The reducing solution 8 has a pH above 7.0. By-products from washing the carbon adsorbent, such as sulfur salts and sulfur-containing species, 9 are removed from the desorber vessel 6. The regenerated carbon 10 is recycled back to the adsorber tank 1.

There are different engineering ways of recycling the carbon adsorbent using the chemistry of this invention, which are known to those skilled in the art. The above example in FIG. 1 is for demonstration. The following examples display thermograms obtained from soaking sulfur-contaminated and non-contaminated carbon adsorbents with reducing solutions at room temperature.

EXAMPLES

To test the use of basic reducing solutions on carbon adsorbents utilized in flue gas desulfurization technology, a thermogravimetric analyzer (TGA) was used to obtain thermograms of clean and contaminated carbon. The carbon loading of sulfur contaminants was found to be about sixteen weight percent. The contaminated carbon was soaked at room temperature in aqueous solutions of sodium carbonate having a pH of 9.0; sodium borohydride, having a pH of 10.0; sodium sulfite having a pH of 9.5; and water alone. The soaked carbon adsorbent was then run in the thermogravimetric analyzer. The produced thermograms showed that the carbon which was soaked in water or sodium carbonate took longer to regenerate the carbon than reducing solutions of sodium sulfite or sodium borohydride. The water or sodium carbonate solutions took approximately three days to regenerate the carbon adsorbent. However, in the use of sodium borohydride or sodium sulfite solutions, regenerated carbon was obtained in less than seven minutes. Since sodium borohydride is a flammable and corrosive chemical, sodium sulfite is preferred. FIGS. 2–7 give the thermograms for clean carbon; carbon soaked in sodium sulfite for fifteen minutes; carbon soaked in sodium sulfite for seven minutes; carbon soaked in water alone for twelve hours; carbon soaked in sodium carbonate for three days; and carbon soaked in sodium borohydride for seven minutes; respectively.

What is claimed:

1. A method for regenerating a carbon adsorbent contaminated with sulfur or sulfur-containing compounds comprising the steps of:

forming a basic reducing solution by admixing a sufficient amount of a reducing agent with water to form an admixture and if needed, adjusting the pH of the admixture to above 7.0 with a sufficient amount of base to obtain the basic reducing solution; and then soaking the contaminated carbon adsorbent in the basic solution at room temperature for a sufficient amount of time to reduce $SO_3$ to a $SO_2$ by-product and to neutralize sulfuric acid to a sulfate salt by-product thereby reducing carbon loss during regeneration of the carbon adsorbent.

2. A method according to claim 1 where the reducing agent is selected from the group consisting of sodium sulfite, sodium borohydride, and mixtures thereof.

3. A method according to claim 2 where the reducing agent is sodium sulfite.

4. A method according to claim 1 where the pH of the reducing solution is between 7.0 to 12.0.

5. A method according to claim 4 where the pH of the reducing solution is between about 8.0 to 10.0.

6. A method according to claim 3 where the time to soak the carbon adsorbent with sodium sulfite reducing solution at room temperature is about fifteen minutes.

7. A method for regenerating carbon adsorbents used in flue gas desulfurization that are contaminated with sulfur-containing species, said method comprises washing the carbon adsorbent with a basic reducing solution having a pH between about 7.0 to 12.0 at room temperature for a sufficient amount of time to remove sulfur-containing species from the carbon adsorbent to regenerate the carbon adsorbent.

8. A method according to claim 7 where the reducing solution is an aqueous solution selected from the group consisting of sodium sulfite solution, sodium borohydride solution, and mixtures thereof.

9. The method of claim 1, wherein the reducing agent is selected from the group consisting of alkaline earth salts of sulfites and borohydrides; alkali salts of borohydrides; mixtures of at least two of the foregoing salts; and organic reducing compounds.

10. The method of claim 7, wherein the reducing solution comprises a reducing agent selected from the group consisting of alkaline earth salts of sulfites and borohydrides; alkali salts of borohydrides; mixtures of at least two of the foregoing salts; and organic reducing compounds.

* * * * *